United States Patent [19]
Minami

[11] Patent Number: 5,372,168
[45] Date of Patent: Dec. 13, 1994

[54] THIN PLATE CUTTING/JOINING APPARATUS

[75] Inventor: Takao Minami, Tokyo, Japan

[73] Assignee: Minami Machine Co., Ltd., Kanagawa, Japan

[21] Appl. No.: 134,759

[22] Filed: Oct. 12, 1993

[30] Foreign Application Priority Data

Oct. 13, 1992 [JP] Japan .................. 4-299092

[51] Int. Cl.⁵ .............................. B27F 1/00
[52] U.S. Cl. .................. 144/347; 144/2 R; 144/90 A; 144/91; 144/352; 144/355; 156/304.5
[58] Field of Search .............. 156/304.1, 304.5; 144/2 R, 3 R, 344, 345, 346, 347, 355

[56] References Cited

U.S. PATENT DOCUMENTS

| | | | |
|---|---|---|---|
| 1,396,971 | 11/1921 | Meyercord | 144/352 |
| 3,229,732 | 1/1966 | Mayo | 144/1 R |
| 3,841,369 | 10/1974 | Roche | 144/346 |
| 4,041,998 | 8/1977 | Moorley | 156/304.5 |
| 4,128,119 | 12/1978 | Maier | 156/304.5 |
| 4,681,645 | 7/1987 | Fukushima et al. | 156/304.5 |
| 4,841,907 | 6/1989 | Otsuka | 144/346 |
| 5,080,154 | 1/1992 | Kallesoe | 156/304.1 |

FOREIGN PATENT DOCUMENTS

| | | | |
|---|---|---|---|
| 46-25838 | 7/1971 | Japan . | |
| 59-5402 | 1/1984 | Japan . | |
| 62-10802 | 3/1987 | Japan . | |
| 3-193401 | 8/1991 | Japan . | |
| 703326 | 12/1974 | U.S.S.R. | 144/347 |

*Primary Examiner*—W. Donald Bray
*Attorney, Agent, or Firm*—Oliff & Berridge

[57] ABSTRACT

A thin plate cutting/joining apparatus includes a cutting apparatus for pressing the front end of a following thin plate and the rear end of a preceding thin plate together and cutting the pressed front and rear ends of the thin plates in stepped scarf shapes; an adhesive coating apparatus for coating an adhesive on the cut surfaces of the end portions of the thin plates; and a joining apparatus for pushing the thin plates coated with the adhesive against each other and vertically pressing them, so as to joining the end portions of the thin plates.

16 Claims, 11 Drawing Sheets

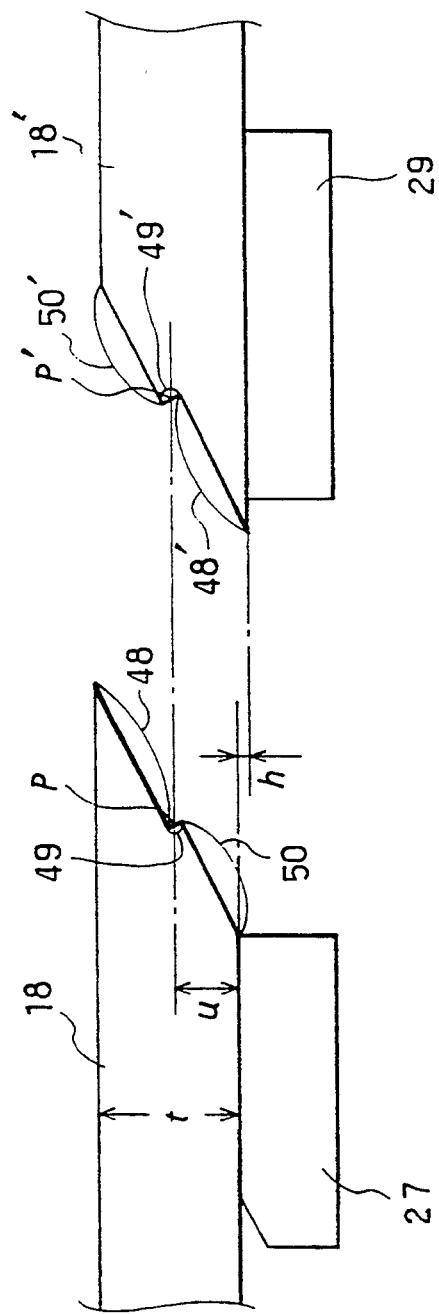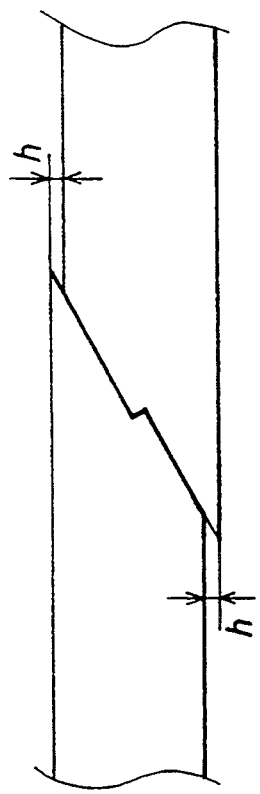

THIN PLATE CUTTING/JOINING APPARATUS

BACKGROUND OF THE INVENTION

1. Field of the Invention

The present invention relates to a thin plate joining apparatus. Here, the wording "thin plate" means a thin plate material, a plywood, or a veneer as a material for manufacturing a plywood or the like.

2. Description of the Related Art

One type of thin plate jointing method is commonly known as scarf jointing. This method consists of obliquely cutting the joint surfaces of thin plates at a small angle as shown in FIG. 1, and joining the cut surfaces of the thin plates to each other (hereinafter, the wording "scarf cutting" means the oblique cutting of the end surface of a thin plate, and the wording "scarf shape" means the sectional shape thereof). The scarf joining method can be used for joining thin plates such as a thin plate material, a plywood or a veneer by forming joints.

One example of thin plate cutting/joining apparatuses for scarf-cutting thin plates and joining them to each other is disclosed in Examined Japanese Patent Publication No. SHO 59-5402 (Thin Plate Cutting/Joining Apparatus). In this apparatus, the end surfaces of fed thin plates to be joined are cut in scarf shapes by a cutter. The cutter is provided at an intermediate position in the infeed and outfeed direction of the thin plates on the same feed plane, and is moved in reciprocating motion in a perpendicular direction to the feeding direction of the above thin plate. The end surfaces thus cut are coated with an adhesive. Subsequently, the thin plates are moved by a specified distance and carried to a joining position, wherein the scarf-shape end surfaces are made to vertically overlap and are joined to each other. Thus, the thin plates are continuously joined to each other.

The technique of cutting the end surfaces of thin plates in a scarf-shape and joining them to each other, however, has the following disadvantages.

1. In a thin plate joining apparatus with a simple structure wherein thin plates are freely carried in the same plane by a conveyor or the like, since the joining surfaces are formed in scarf shapes, when the thin plates are simply pressed in the carrying direction to obtain a strong joint, they may slip along the scarf surfaces and one thin plate may overlap the other as shown in (a), (b) and (c) of FIG. 1. To avoid this phenomenon, that is, to firmly join the rear end of the preceding thin plate to the front end of the following thin plate, the joining may be performed such that the moving distance from the front end stopping position of the following thin plate to the rear end stopping position of the preceding thin plate is made constant. However, there often occurs overlap due to subtle errors in feeding, stopping and supporting of the thin plates, or a gap between the joining surfaces because of shortage of moving distance. Therefore, since the joining surfaces are not usually in close contact with each other, it is difficult to make the join surfaces accurately meet each other.

2. In the "Thin Plate Cutting/Joining Apparatus" in Examined Japanese Patent Publication No. SHO 59-5402 described above, the joining is performed in the following manner. The preceding thin plate is fixed at the position where it is cut at the rear end. The following thin plate is also cut at the front end and coated with an adhesive thereon, and is moved from the cutting position by a specified distance up to the rear end cutting position of the preceding thin plate. The scarf portions of the two thin plates are then pressed from the upper side to be joined to each other. Accordingly, when the thin plates are cut and joined, the next thin plate cannot be cut, making it impossible to perform the joining of thin plates by mass production. This lowers productivity and, further, requires an apparatus for lifting and lowering the thin plates from the carrying plane, thus complicating the structure of the whole apparatus.

SUMMARY OF THE INVENTION

Accordingly, an object of the present invention is to provide a thin plate cutting/joining apparatus capable of performing the cutting and joining of the end surfaces of thin plates through a series of mass production lines, this apparatus being capable of perfectly joining thin plates without any overlapping of one thin plate on the other or the generation of a gap, by means of a simple structure which eliminates both the control of the moving distance of the thin plates and the lifting movement of the thin plates from the carrying surface.

To achieve the above object, according to the present invention, there is provided a thin plate cutting/joining apparatus comprising an infeed conveyor control means for controlling the operation of an infeed conveyor such that the front end of one thin plate reaches a specified front end stopping position; a feed conveyor control means for controlling the operation of a feed conveyor such that the rear end of the thin plate preceding to this thin plate reaches a specified rear end stopping position; a cutting apparatus for cutting the rear end of the preceding thin plate and the front end of the following thin plate to stepped scarf shapes at the above stopping positions; a feed conveyor for carrying the thin plates cut in the front and rear ends by the cutting apparatus to a joining apparatus; an adhesive coating apparatus provided in the path of the above carrying conveyor for coating an adhesive on the cut surfaces of the front end and/or the rear end of the thin plates cut at the front and rear ends; and a joining apparatus for pushing the front end of the following thin plate to the rear end of the preceding thin plate in the feed direction, or further vertically pressing them together after coating the adhesive thereon by the adhesive coating apparatus, so as to thus adhesively bond them.

As cutters for cutting the end surfaces of the thin plates in stepped scarf shapes, the following three modes may be considered. A cutter of a first mode is of a type in which two sets of circular saws, each set having two different diameters, are coaxially mounted on a motor so that they may be vertically reversed with respect to each other. FIG. 3 shows the cutter of this mode viewed from the infeed side of the thin plates. In FIG. 3, reference numeral 19 indicates a cutter; 22 is a circular saw for cutting a front end; 22' is a circular saw for cutting a rear end; 23 is a motor; and 24 are rails along which the cutter is moved. In the cutter of this mode, the shaft of the motor is inclined on this side of the figure. FIG. 4 is a right side view of the circular saw portions of FIG. 3. The circular saws (22b, 22'b, 22a, 22'a) with two different diameters are disposed such that the cutting surfaces of the circular saws are slightly inclined to the feed surface, and the two sets of circular saws are moved horizontally (from the front to the rear or from the rear to the front with respect to the plane of FIG. 4), that is, perpendicularly to the feed direction of the thin plates while being rotated. Thereby, the front end of the following thin plate 18 and the rear end of the preceding thin plate 18' are cut in stepped scarf shapes. In addition, in FIG. 4, characters A and B show the front end and rear end stopping positions of the thin plate, respectively.

FIG. 5 is a view of a cutter of a second mode viewed from the infeed side of thin plates. The cutter of the second mode is of a type in which the two sets of the circular saws mounted on the motor in the first mode are independently mounted on different motors. In the cutter of this mode, the shafts of the motors are also inclined on this side of the figure.

FIG. 6 is a view of a cutter of a third mode viewed from the infeed side of the thin plates. FIG. 7 is a right side view of FIG. 6. The cutter of this mode is of a type in which stepped bevel-like cutters 51 and 52, which may be vertically reversed with respect to each other, are independently mounted on different motors. In the cutter of this mode, differently from the above two cutters, the shafts of the motors are disposed in the vertical direction.

In the apparatus according to the present invention, thin plates are fed to a cutting apparatus section by a feed conveyor one by one. Then, as shown in FIG. 2, the rear end of the preceding thin plate 18' and the front end of the following thin plate 18 are cut to stepped scarf shapes. The thin plate 18 and/or the thin plate 18' are coated with an adhesive on the scarf surfaces. Next, the front end of the following thin plate 18 is pushed against the rear end of the preceding thin plate 18', or further they may be vertically pressed together. Thus, the thin plates are adhesively bonded to each other.

According to the present invention, as shown in FIG. 2, in order that the front end of the thin plate 18 and the rear end of the preceding thin plate 18' are firmly fitted to each other, they are cut in stepped scarf shapes. Accordingly, by carrying the front end of the following thin plate until it hits the rear end of the preceding thin plate which waits while being pressed and held by [a] springs or the like, press-feeding it against the pressing-/holding force, stopping it and pressing it from the upper side, the front and rear end of the thin plates are brought into close contact with each other, so that the preceding and following thin plates can be joined in the same plane without generating a vertical deviation such as overlap.

When the following thin plate is carried by more than the distance between the preceding thin plate and same, since the preceding thin plate is pressed and held, the following thin plate presses the preceding thin plate while receiving pressure at the joining surface from the preceding thin plate. For this reason, it is possible to obtain sufficient joint strength. The joining performed by vertically pressing the following thin plate against the preceding thin plate, which is held, is referred to as "press-feeding" hereinafter.

BRIEF DESCRIPTION OF THE DRAWINGS

Some preferred embodiments of the invention will now be described with reference to the drawings, wherein like elements have been denoted throughout the figures with like reference numerals, and wherein:

FIGS. 10A and 10B are views showing a method for forming stepped scarf shapes by introducing a difference from a lower base plate;

DETAILED DESCRIPTION OF THE PREFERRED EMBODIMENT

Hereinafter, one embodiment of the present invention (hereinafter, referred to as "this embodiment") will be described with reference to the drawings.

Figure 8:
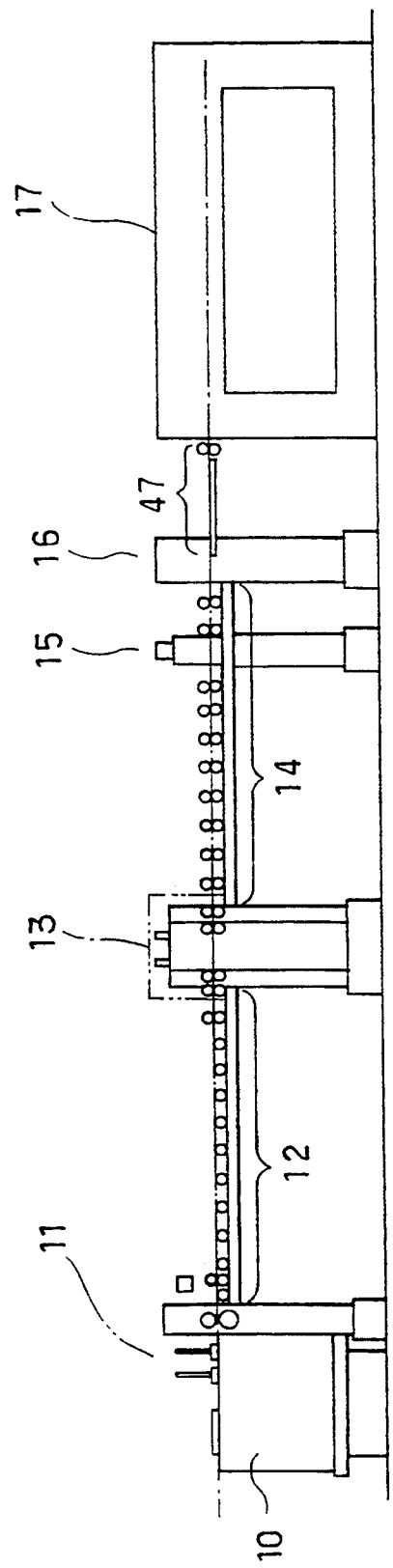
FIG. 8 is a side view of the embodiment of FIG. 7.

FIG. 8 is a side view of this embodiment. In this figure, reference numeral 10 indicates a thin plate loading section; 11 is a thin plate loading apparatus; 12 is an infeed conveyor; 13 is a cutting apparatus; 14 is a feed conveyor; 15 is a jointing apparatus; 16 is a full size clipping apparatus; and 17 is a joined thin plate stacking apparatus.

Hereinafter, the structure and the function of this embodiment will be described in detail in the order of a thin plate loading process, a pressing process, a cutting process, a joining process, and a clipping process.

Thin Plate Loading Apparatus and Feed Conveyor

The thin plate loading apparatus 11 is intended to feed thin plates loaded on the thin plate loading section 10 to the infeed conveyor 12 one by one from the upper side with an attracting apparatus using a negative pressure such as from a blower or by means of a person's hand.

The fed thin plate can be inspected for specifications and quality using a known detecting apparatus. At this time, thin plates with dimensions deviating from the specifications or of poor quality may be discharged from the apparatus.

Further, a running belt, a guide plate or the like may be provided on either of the right and left sides of the feed direction, so that the lateral position of the fed thin plate is usually aligned by bringing the side edge of the thin plate into contact with the above running belt or the guide plate.

Figure 4:
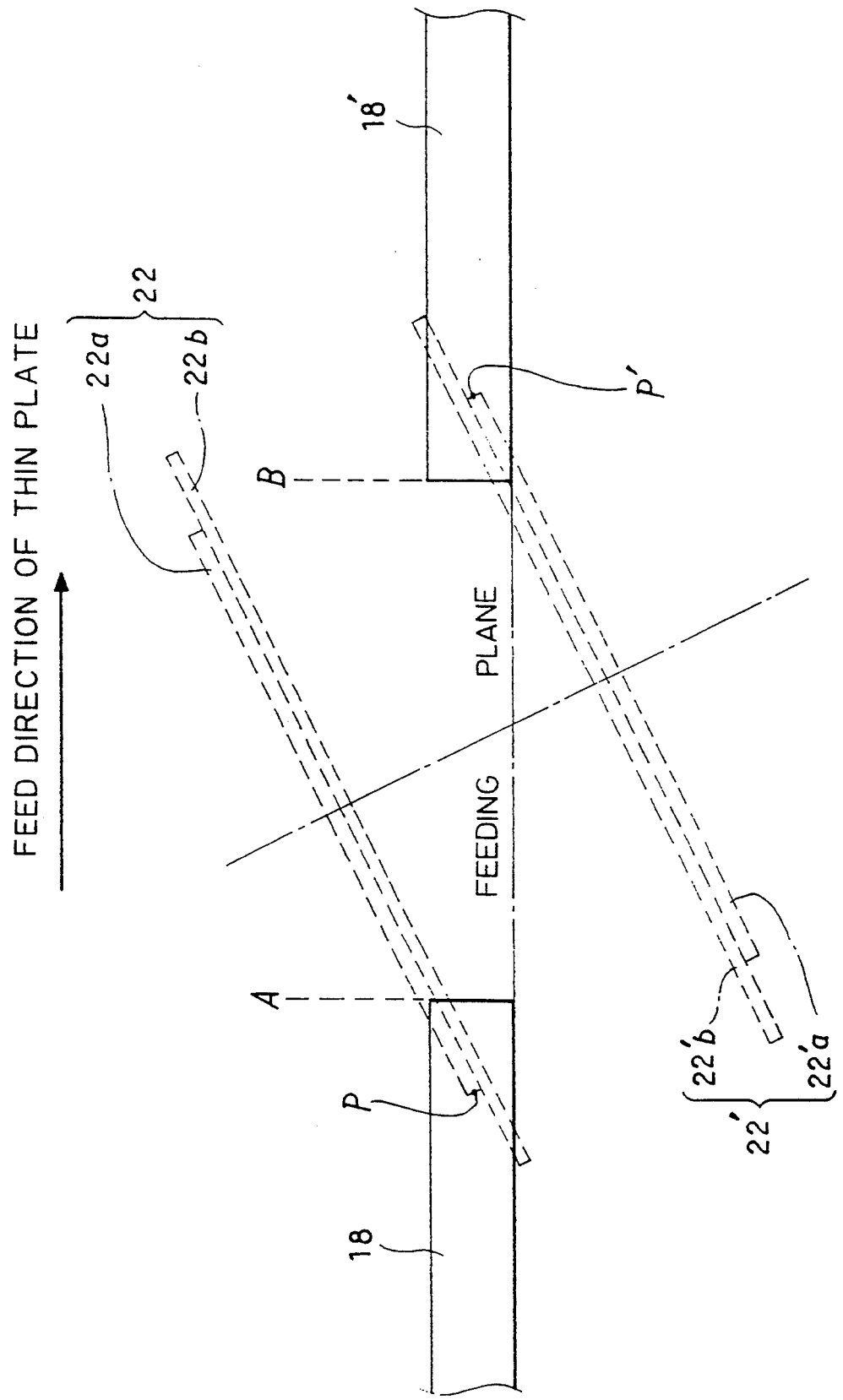
FIG. 4 is a view showing a method for forming stepped scarf shapes by means of circular saws in the embodiment of FIG. 3.
Figure 9:
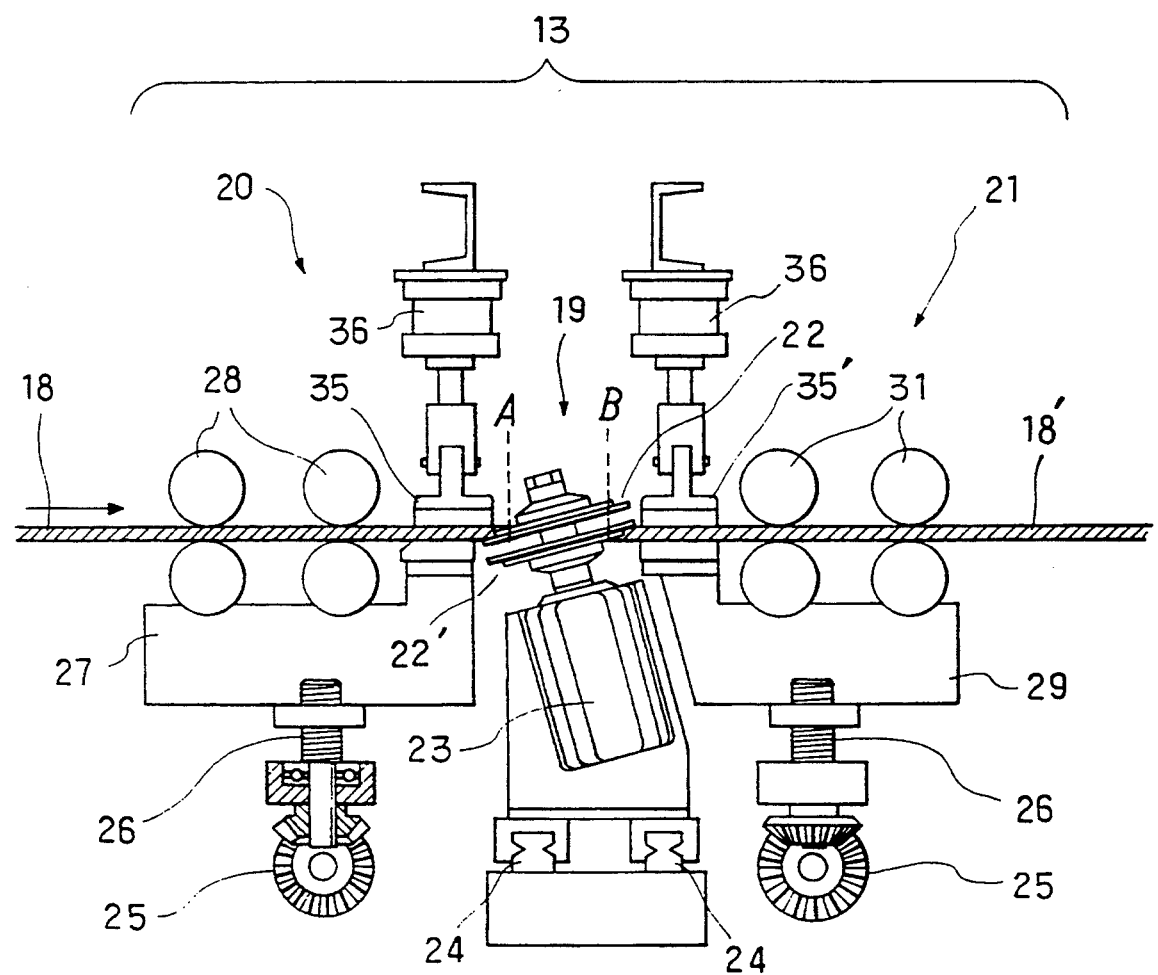
FIG. 9 is a side view showing a front end pressing apparatus, a scarf-cutter and a rear end pressing apparatus.

The infeed conveyor 12 has such a function as to carry the thin plate fed by the above thin plate loading apparatus 11, and to stop it when the front end of the thin plate reaches a front end stopping position A (see FIGS. 4 and 9). The infeed conveyor stopping mechanism pertains to the prior art technique, which uses known thin plate front end detecting means such as photoelectric sensors or limit switches provided at positions in the vicinity of the infeed end of the infeed conveyor 12 or between rows of rollers; and a delay means such as a timer. The stopping mechanism detects the front end of the fed thin plate, and stops the operation of the carrying conveyor 12 such that the front end of the thin plate reaches the specified front end stopping position A.

The thin plate, which is pressed and cut at the front end after stopping, is subsequently carried to a specified rear end stopping position B (see FIGS. 4 and 9) so as to be cut at its rear end. At the same time, a new thin plate is carried to the specified front end stopping position A by the infeed conveyor 12 so as to be cut at the front end. Thus, while the newly fed thin plate is carried to the front end stopping position A, the thin plate previously inserted and cut at its front end is carried to the specified rear end stopping position B so as to be cut at its rear end.

Cutting Apparatus

FIG. 9 is a side sectional view of the cutting apparatus 13. The cutting apparatus 13 includes thin plate pressing apparatuses (a front end pressing apparatus 20 and a rear end pressing apparatus 21) and a cutter 19. The structure and the operational effect of the thin plate pressing apparatuses and the cutter will be described in the following paragraphs.

Thin Plate Pressing Apparatus

The thin plate pressing apparatus for pressing and holding a thin plate when the thin plate is cut in its end portion will now be described.

As shown in FIG. 9, the thin plate pressing apparatuses 20 and 21 include lower base plates 27 and 29 and upper pressing members 35 and 35', respectively. Reference numeral 20 indicates the front end pressing apparatus for holding the front end of a thin plate 18 on the infeed conveyor 12, which is intended to press the newly fed thin plate such that the front end thereof reaches the stopping position A. Reference numeral 21 is a rear end pressing apparatus for fixing the rear end of the thin plate on the feed conveyor, which is intended to press the thin plate such that the rear end of the thin plate cut at the front end in a scarf shape reaches the specified stopping position B to be cut at its rear end. Each of the lower base plates 27 and 29 is intended to support a thin plate from the underside. The height of the base plates 27,29 are adjusted with respect to the cutter 19 so that the stepped portion of the scarf reaches approximately the center of the thickness of a thin plate even if the thickness of the fed thin plate is changed.

Adjustment of Height of Lower Base Plate

In this embodiment, the lowermost point (p shown in FIG. 4) of the center of the tooth thickness of a circular saw 22a and the uppermost point (p' shown in FIG. 4) of the center of the tooth thickness of a circular saw 22'a are previously set to be at a similar height from the feed plane. Accordingly, in the case that the plate thickness is changed and the heights of the lower base plates 27 and 29 are adjusted, the two base plates are moved up and down by the same amount such that the line connecting the points p and p' (p-p' line) is set approximately at the center of the plate thickness. Consequently, the stepped portion of the scarf is formed approximately at the center of the plate thickness. The adjustment of the lower base plates of the pressing apparatuses is performed by means of gears 25 and screws 26 as shown in FIG. 9.

Differently from the usual adjustment for changing the heights of the lower base plates 27,29 by the same amount, the following adjustment is possible depending on special requirements for surface finish. Namely, in this embodiment, the heights of the lower base plates 27 and 29 can be independently adjusted. Accordingly, as shown in FIG. 10A, the height of the lower base plate 27 can be adjusted to be higher than that of the lower level block 29 by an amount h so that the above p-p' line is located at a position slightly lower than the center of the thickness of the thin plate 18 (to satisfy the relation u less than 0.5 t in FIG. 10A). Consequently, the stepped portion of the scarf is formed at a position slightly lower than the center of the thickness of the thin plate 18. When the thin plate 18, after being cut, is press fed to the thin plate 18' and is joined thereto, the joining can be performed in such a state that each of the sharp leading edges in the scarf section projects outward by the amount h, as shown in FIG. 10B, because stepped portions 49 and 49' are fitted to each other. Thus, in the case where the surface of the thin plate is finished by a sanding machine, a scraper or the like, a preferred surface finish can be performed without any dent at the joint portion appearing on the surface of the thin plate.

Construction and Function of the Pressing Apparatus

The front end pressing apparatus 20 in FIG. 9 is intended to press the thin plate, which has been stopped at a specified position by applying a clamping apparatus to the upper pressing portion, and to hold the end portion of the thin plate in the same plane so as to prevent deflection upon cutting and thereby promote accurate cutting.

Figure 11:
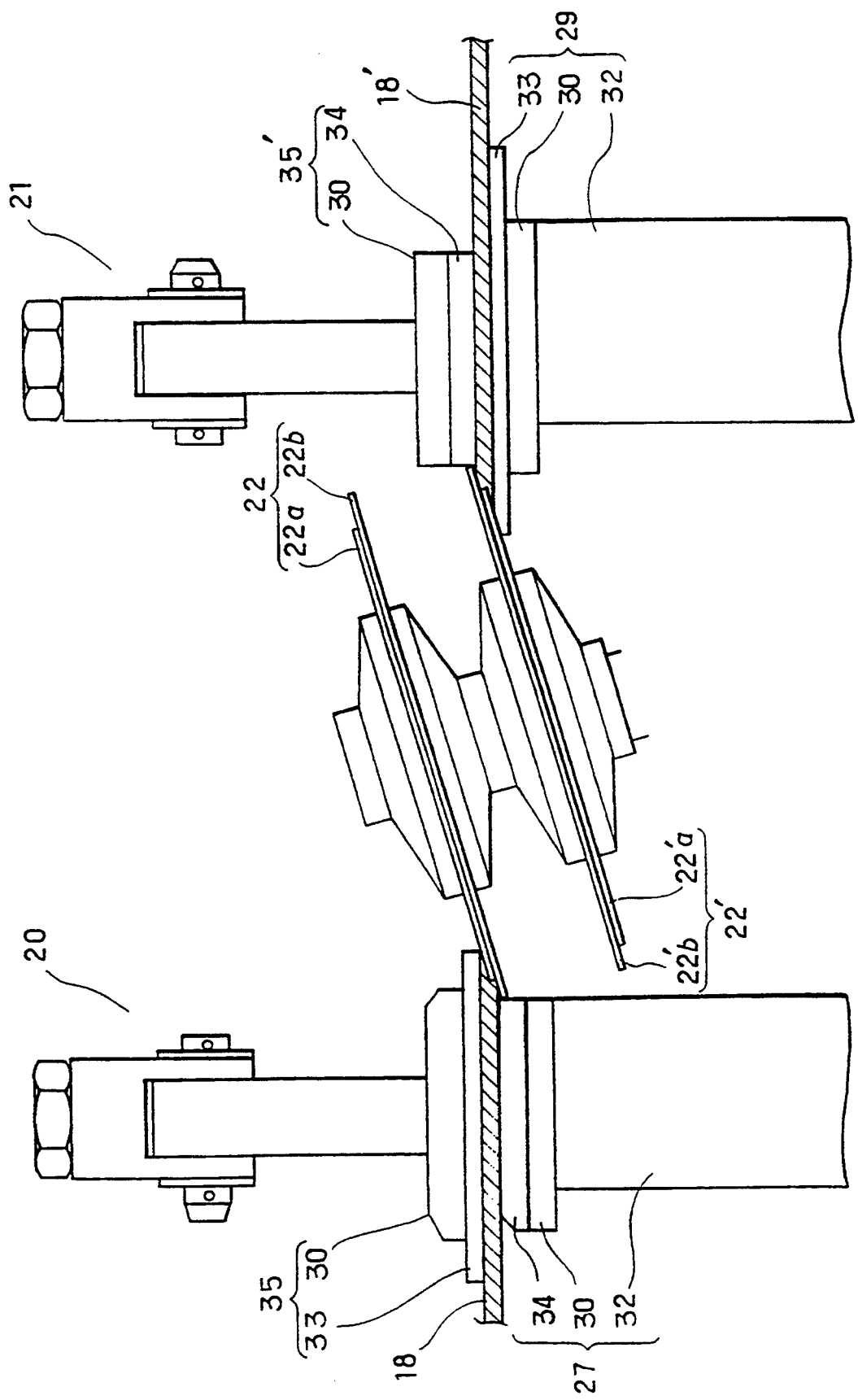
FIG. 11 is an enlarged side view of main parts of front end and rear end pressing apparatuses, and a scarf-cutter in the embodiment of FIGS. 4 and 9.

FIG. 11 is a partially enlarged view of the vicinities of the front end and rear end stopping positions A and B in FIG. 9. As shown in FIG. 11, the pressing member of the front end pressing apparatus 20 includes the lower base plate 27 and the upper base plate 35. The lower base plate 27 has a base plate 32 made from steel or the like and an upper metal plate 30, on which an elastic body 34, such as rubber, is also attached. The upper base plate 35 has a metal plate 30, under which a plate 33 made from a material having a suitable hardness and capable of being cut by a circular saw, for example Bakelite (hereinafter, referred to as a Bakelite plate), is also attached. The upper base plate 35 is connected to an air cylinder 36 through a column. By adjustment of the air pressure in the air cylinder, the upper base plate 35 is moved up and down so as to press the thin plate between the lower level block 27 and the plate 33, and to release the pressing. The reason why the portion of the lower level block 27 in contact with the thin plate is formed of the elastic body 34 is to firmly press even a veneer with a waving generated by drying or a thin plate with irregularities, such as the thin plate of a conifer, and to ensure the desired cutting for such a thin plate. Further, by additionally providing the Bakelite plate 33 under the metal plate 30 of the upper level block 35, the tip of a cutting circular saw 22 for cutting the thin plate from the oblique upper side is prevented from coming into direct contact with the metal plate. Accordingly, due also to the provision of the elastic body 34, damage to the tips of the cutting circular saw 22 is eliminated. As a result, the upper and lower level blocks 27,35 can press and hold the part very near the leading edge of the thin plate 18 before cutting. This enables the desired cutting without any deflection of the thin plate upon cutting.

The pressing member of the rear end pressing apparatus 21 includes a lower base plate 29 and a lower base plate 35'. As shown in FIG. 11, the cutting of the rear end of the thin plate 18' by the circular saw 22' is performed in such a manner as to be reversed by 180° with respect to the cutting of the front end of the thin plate 18 by the circular saw 22. Accordingly, the structure of the pressing member of the rear end pressing apparatus 21 is vertically reversed with respect to that of the pressing member of the front end pressing apparatus 20 described herein above, so that the effect of the rear end pressing member exerted on the cutting of the rear end of the thin plate 18' is the same as the effect of the front end pressing member exerted on the cutting of the front end of the thin plate 18.

Cutter

The cutter 19 includes two sets of cutting circular saws 22 and 22' provided around the shaft of a motor 23, which is disposed on rails 24 running perpendicular to the feed direction of the thin plates, that is, in the direction from the front to the rear of the plane of FIG. 9. The shaft of the motor 23 is, as shown in FIG. 9, inclined from the vertical direction toward the infeed direction with respect to the feed surface. The inclined angle is within the range of from 5 to 45 degrees and, more preferably, within the range of from 10 to 20 degrees. When the thin plates 18,18' are carried to the front end stopping position A and the rear end stopping position B and held by the pressing apparatuses 20,21, as described above, respectively, the motor 23 is operated to rotate the circular saws 22 and 22', and the cutter 19 is moved on the rails 24 in the direction perpendicular to the feed direction of the thin plates (i.e., in the direction from the front to the rear or the rear to the front of the plane of FIG. 9) by a drive mechanism through a chain or the like. Thus, the front end of the thin plate 18 on the infeed side, held by the pressing apparatus 20, and the rear end of the thin plate 18' on the outfeed side, held by the pressing apparatus 21, are cut concurrently.

Figure 1:
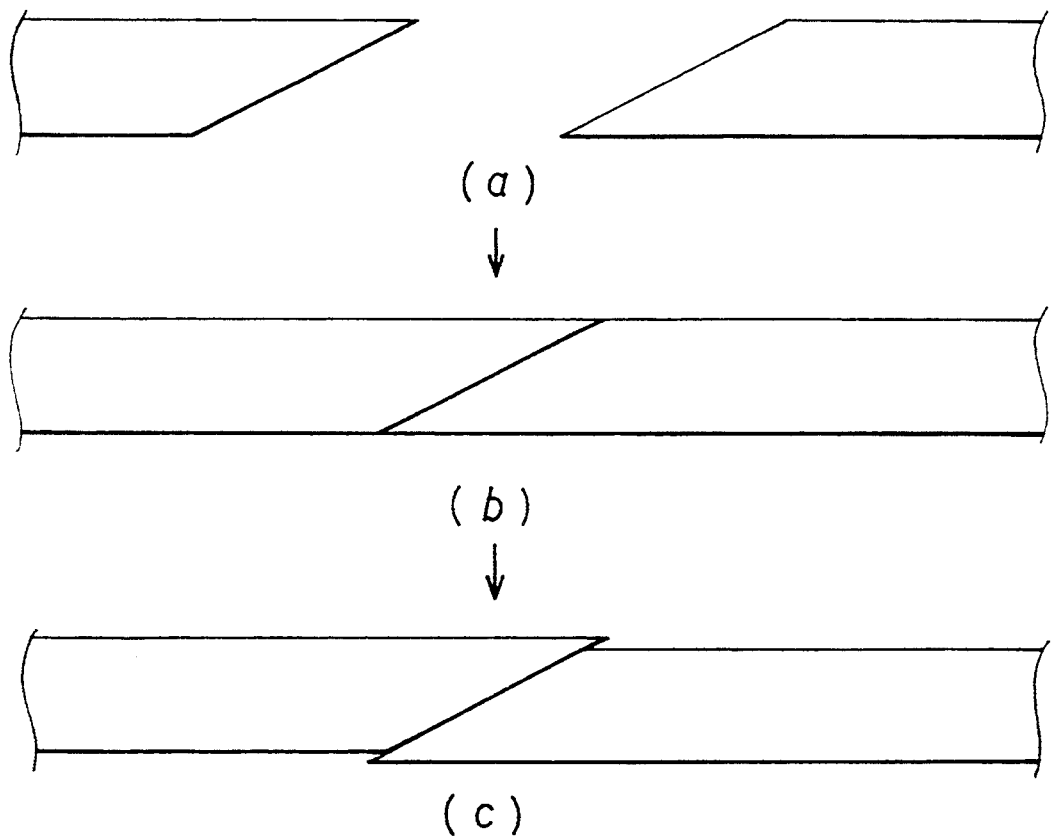
FIGS. 1(a–c) are views showing the state of a scarf joint between thin plates.
Figure 2:
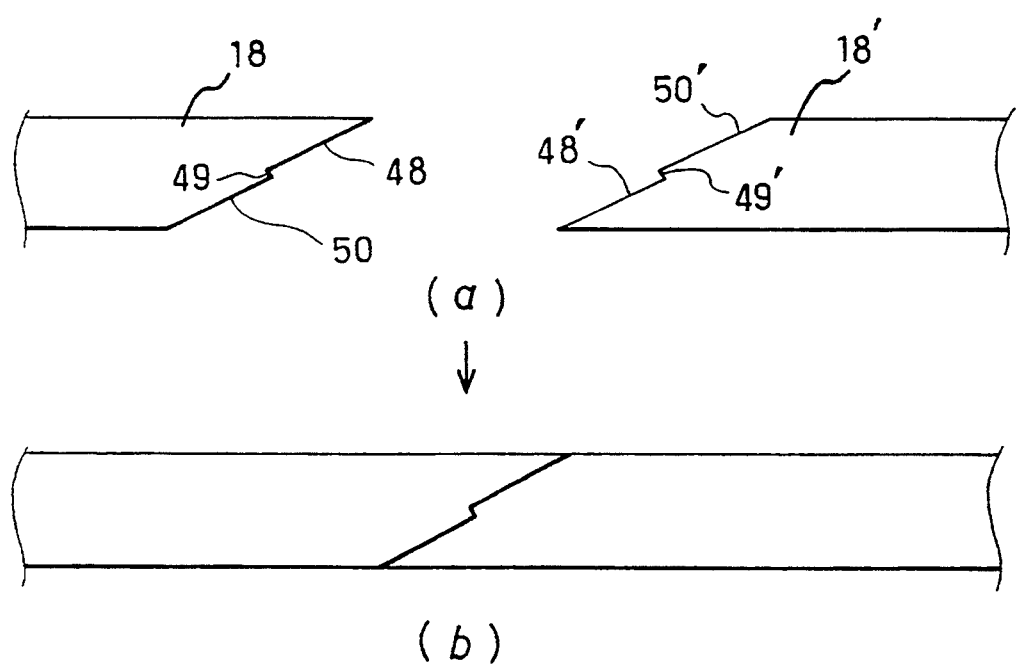
FIGS. 2(a–c) are views showing a stepped scarf joint.
Figure 3:
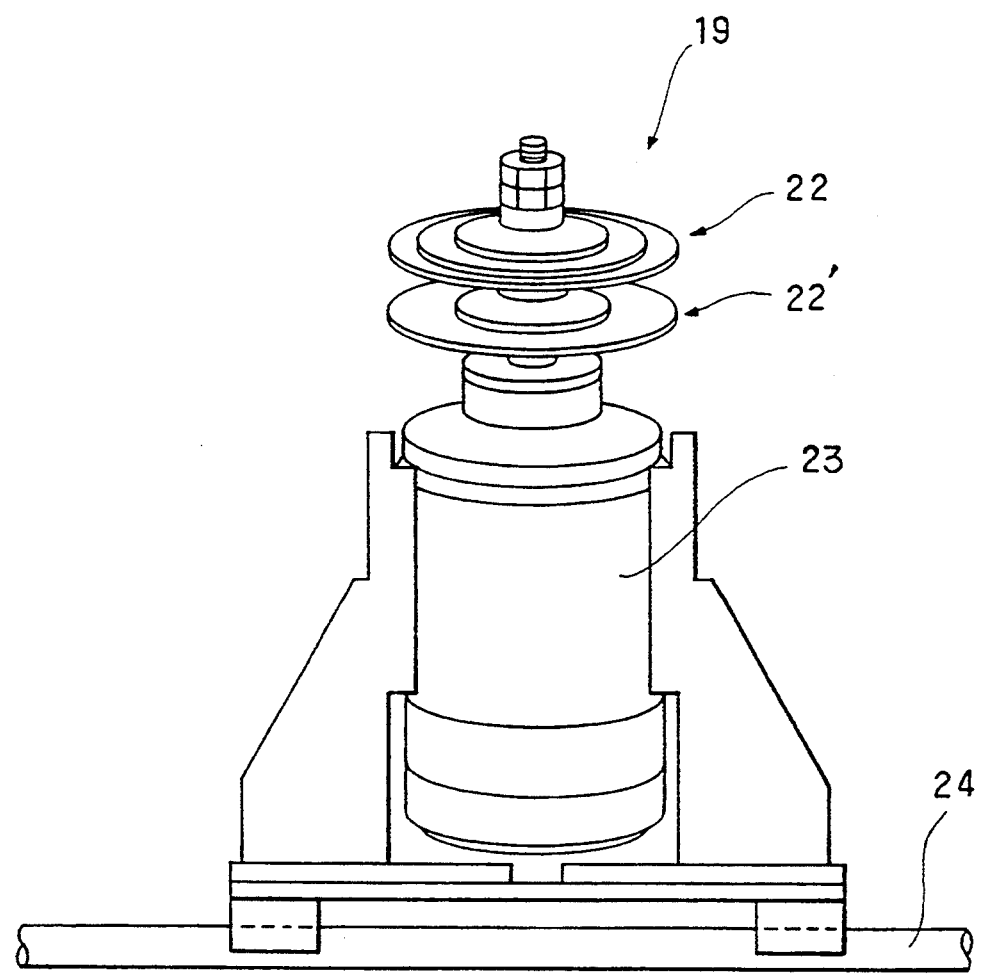
FIG. 3 is a front view of one embodiment of a scarf-cutter.

The shape of the circular saws and the formation of the cutting surface by the circular saws will be described with reference to FIGS. 4 and 11 and, further, FIG. 2 which shows the sectional shapes of the front and rear ends of the thin plates after cutting. Each of the circular saws 22 and 22' is formed of an assembly of two kinds of circular saws of the same type. As shown in FIGS. 4 and 11, in the circular saw 22, a circular saw 22a having a small diameter is made to overlap a circular saw 22b having a large diameter. On the other hand, in the circular saw 22', the circular saw 22'b having a large diameter is made to overlap on the circular saw 22'a having a small diameter. When the thin plates 18,18' are cut by use of the above circular saws 22,22', the cutting surfaces are formed in stepped scarf shapes as shown in FIG. 2. Namely, a scarf surface 48 and a stepped portion 49 are formed on the front end of the thin plate 18 by the circular saw 22a having a small diameter, and a scarf surface 48' and a stepped portion 49' are formed on the rear end of the thin plate 18' by the circular saw 22'a having a small diameter. Further, a scarf surface 50 and a scarf surface 50' are respectively cut by the respective large diameter circular saws 22b,22'b. Thus, end surfaces with the stepped scarf shapes, as shown in FIG. 2, are formed. The stepped portions 49 and 49' are equal to the thicknesses of the circular saws having a small diameter.

Figure 5:
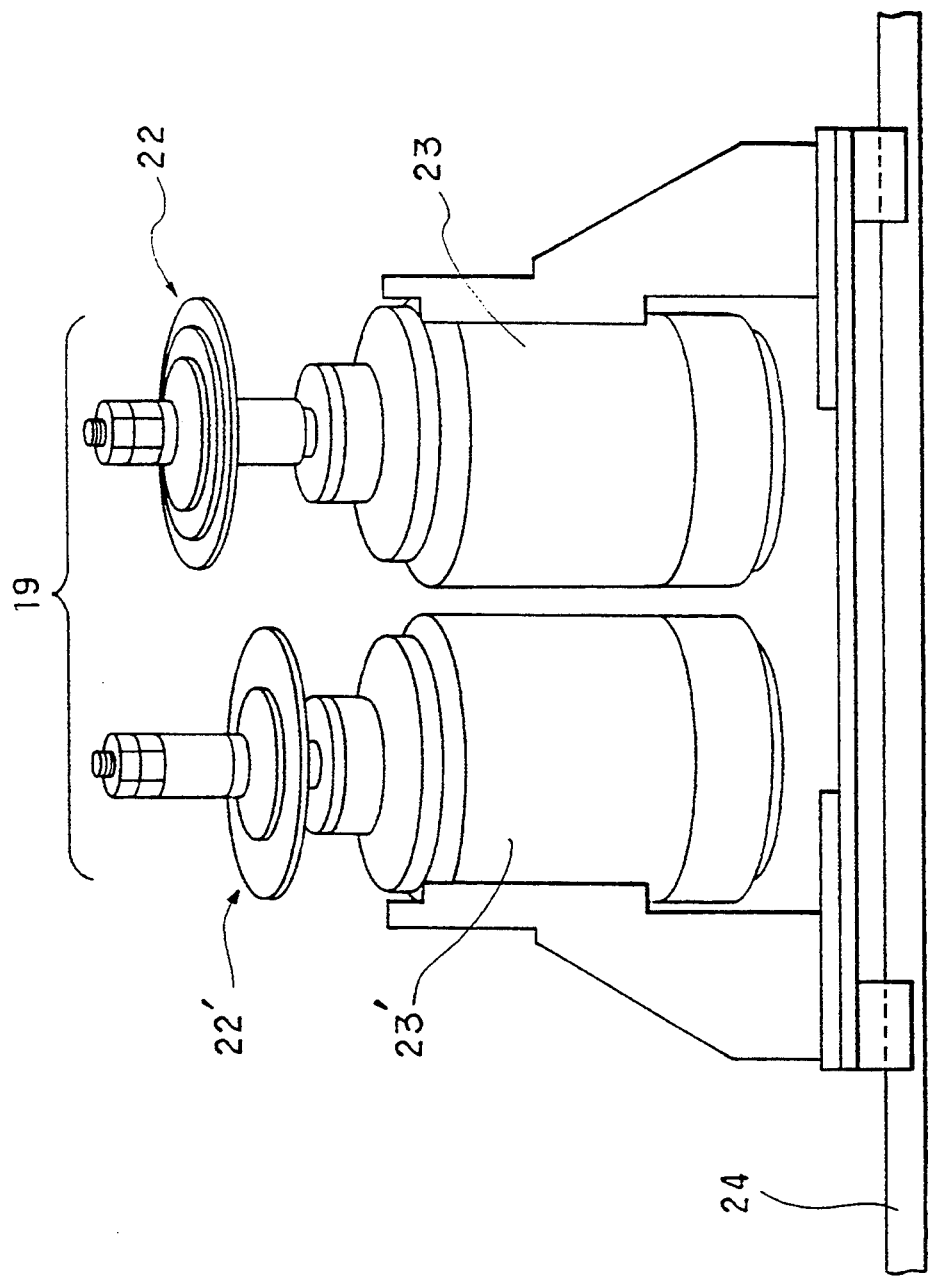
FIG. 5 is a front view of another embodiment of a scarf-cutter.
Figure 6:
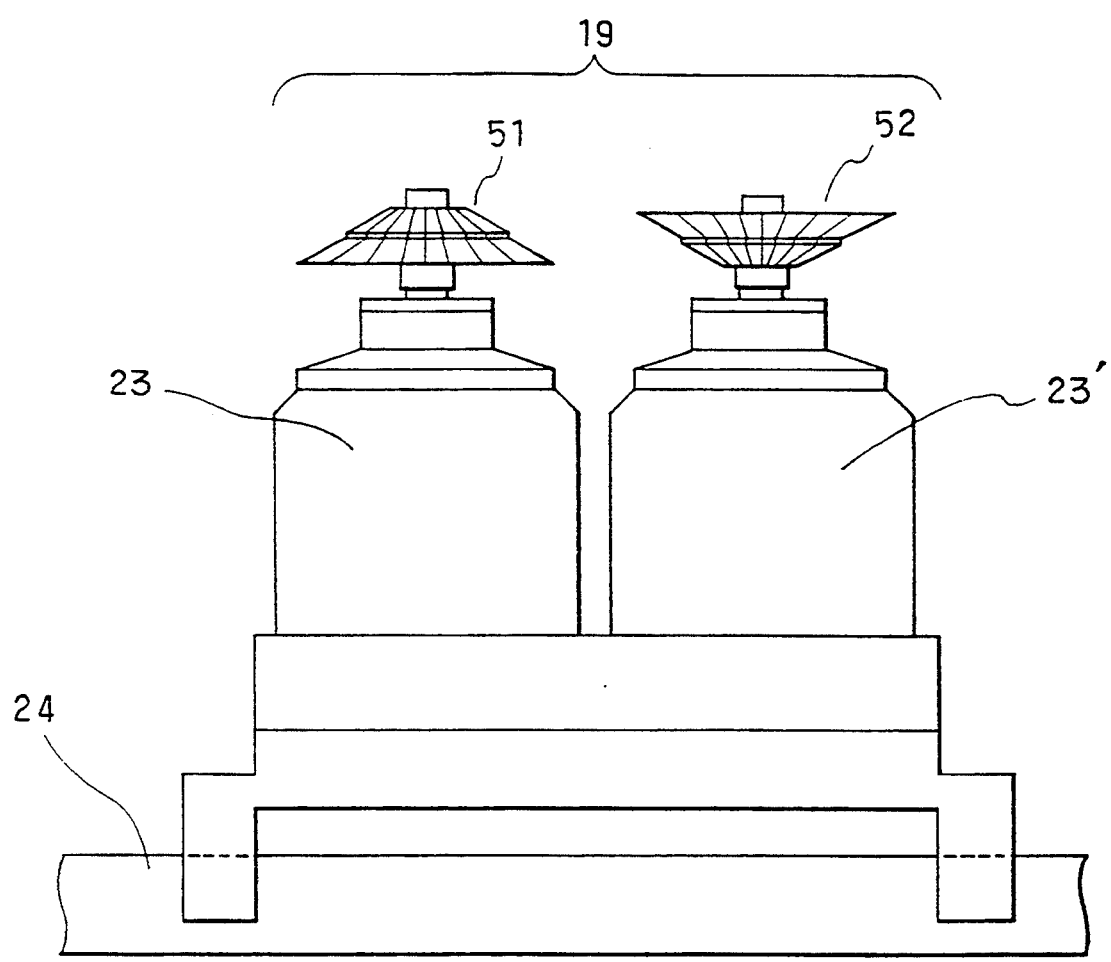
FIG. 6 is a front view of a further embodiment of a scarf-cutter having a bevel-like cutter.
Figure 7:
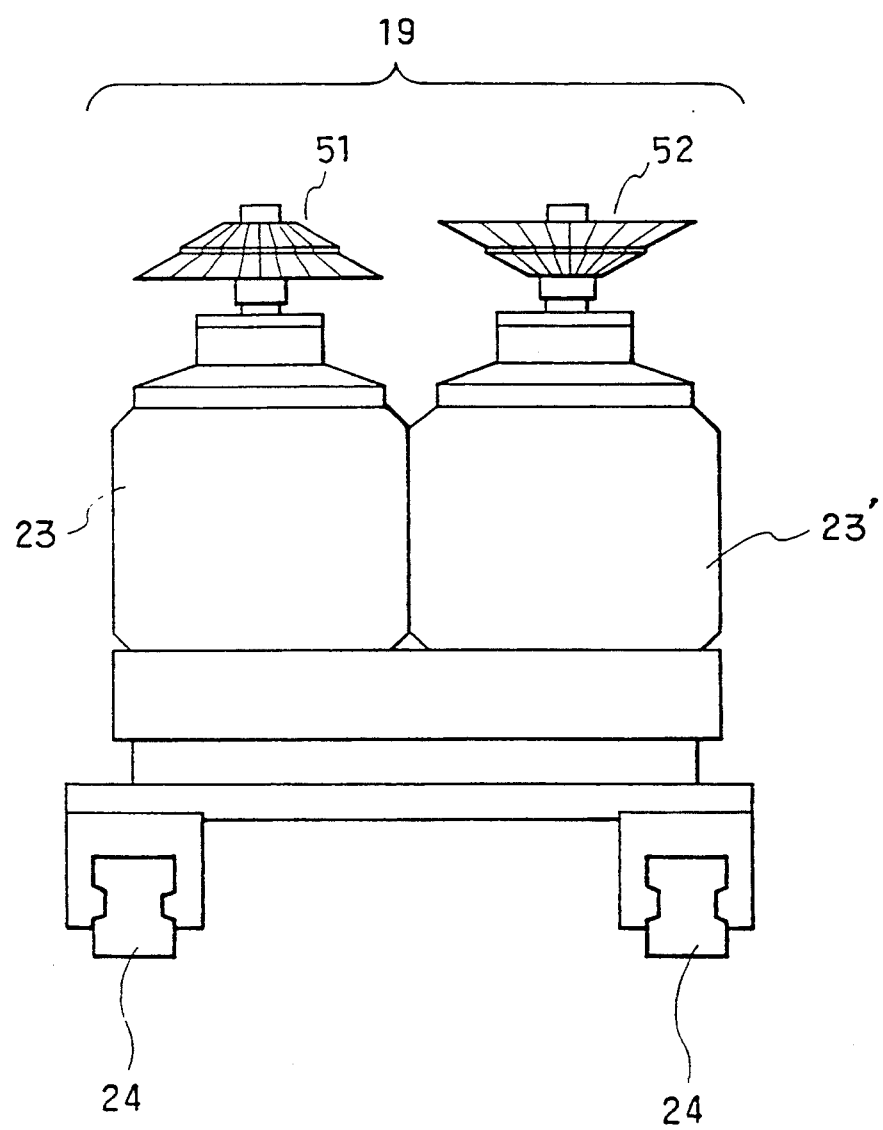
FIG. 7 is a right side view of FIG. 6.

In this embodiment, as shown in FIGS. 9 and 11, two sets of cutting circular saws 22, 22' are provided on the one motor 23. However, in another embodiment, two motors 23, 23' are provided on a moving base parallel to each other, as shown in FIG. 5. The two sets of the circular saws 22,22' may be respectively provided on the two motors 23,23' such that the heights thereof with respect to the drive shafts are different from each other. Further, as shown in FIGS. 6 and 7, stepped bevel-like cutters, which are vertically reversed with respect to each other, may be provided on the different motors 23, 23'.

When the cutting of the front and rear ends of the thin plates 18,18' is completed, the thin plate 18', cut at the rear end, is released from the rear end pressing apparatus 21, and is carried out of the rear end stopping position B by the feed conveyor 14 (see FIG. 8). Also, thin plate 18 cut at the front end is released from the front end pressing apparatus 20, and is carried from the infeed conveyor 12 to the feed conveyor 14 where it is moved by the feed conveyor 14 until the rear end thereof reaches the rear end stopping position B (see FIGS. 8 and 9). At the same time, the infeed conveyor 12 carries in a new thin plate (not cut at the front end) until the front end thereof reaches the front end stopping position A. Thus, the thin plate cut in the front end is carried to the rear end stopping position B to be cut at the rear end, and a new thin plate is carried to the front end stopping position A to be cut at the front end. Next, the thin plates are pressed at the stopping positions A, B by the pressing apparatuses 21,20, cut in the front and rear ends, respectively, and are then subjected to the same process as described herein above.

Adhesive Coating Apparatus

The thin plate 18 cut at the front and rear ends is carried out of the rear end stopping position B by the feed conveyor 14, and is then coated on its front end with an adhesive by an adhesive coating apparatus 37 (described hereinafter) provided in the path of the feed conveyor 14, after which the thin plate 18 is joined to the preceding thin plate 18' by a joining apparatus 15 (see FIG. 8).

Figure 12:
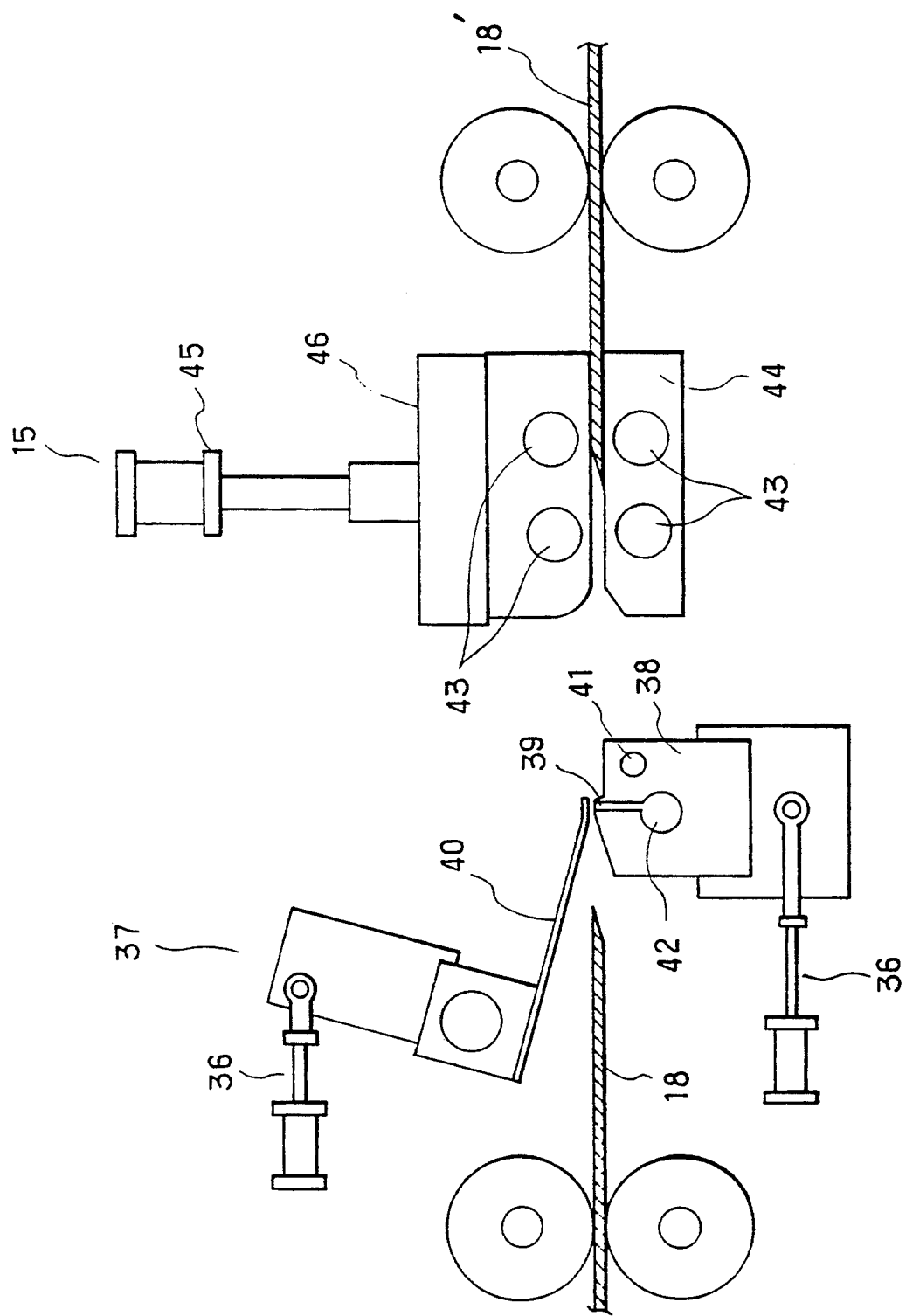
FIG. 12 is a side view of an adhesive coating apparatus and a joining apparatus.

FIG. 12 shows a side sectional view of the adhesive coating apparatus 37 and the joining apparatus 15. The adhesive coating apparatus 37 is intended to coat an adhesive on the front end cut surface of the thin plate. It uses a hot melt adhesive which is a thermoplastic adhesive in this embodiment. The adhesive coating apparatus 37 includes a plurality of adhesive coating blocks 38. The plurality of adhesive coating blocks 38 are disposed on the line perpendicular to the feed direction between the rows of rollers of the feed conveyor 14 with specified intervals. The adhesive is stored in an adhesive tank (not shown) in the molten state, and is supplied from the adhesive tank to each of the adhesive coating blocks 38.

In FIG. 12, reference numeral 42 indicates a supply passage for a hot melt adhesive which is heated and molten, and 41 is a heater for maintaining the molten state of the hot melt adhesive. Further, reference numeral 39 indicates a discharge port for the adhesive. The adhesive supplied from the adhesive tank to each of the adhesive coating blocks is applied with pressure and is prevented from naturally overflowing from the discharge port 39 by provision of a control valve such as a solenoid valve in the adhesive supply passage 42 in the adhesive coating block 38. As shown in FIG. 12, the adhesive coating block 38 may be rocked up and down by a rocking apparatus consisting of an air cylinder 36. The upper surface of the adhesive coating block 38 is formed in the manner of a discharge surface inclined upward to the feed direction and on which the discharge port 39 is provided.

Thin restricting plates 40, each being formed of a leaf spring or the like and being inclined downward in the feed direction, are respectively provided over the plurality of the adhesive coating blocks 38 to restrict the thin plate 18 such that the scarf cut surface is accurately brought into contact with the upper surfaces of the adhesive coating blocks. The leading edge of the thin restricting plate 40 is in contact with, or close to, the discharge surface at a position over the discharge port 39 of the adhesive coating block 38 waiting for the thin plate 18. The thin restricting plate 40 is provided such that the distance from the carrying surface is smaller than the thickness of the carried thin plate 18. As shown in FIG. 12, the restricting plate 40 can be moved up and down by the air cylinder 36.

The coating of the adhesive on the front end cut surface of the thin plate applied is as follows. Firstly, a thin plate detector (not shown) detects the front end of the carried thin plate 18, and supplies a signal to a controller for controlling the air cylinder 36 and the control valve. The controller then operates, and when the front end of the thin plate 18 passes over the discharge ports 39, the control valve is opened so that the adhesive is discharged in a suitable amount. Thus, the discharge ports 39 and the thin restricting plates 40 are pressed on the front end part of the thin plate 18 and the adhesive is coated on the front end cut surface of the thin plate 18. Directly after the coating, the adhesive coating blocks 38 are rocked forward (outfeed side of the thin plate 18), the discharge ports 39 are separated from the lower surface of the thin plate 18 to prevent the adhesive from being stuck on the thin plate 18, and concurrently the thin plate restricting plates 40 are moved upward so as not to obstruct the advancing of the thin plate 18. The discharge ports 39 thus separated from the thin plate and the restricting plates 40 are returned to their specified original positions when the rear end of the thin plate passes therethrough.

The above thin plate detector consists of photoelectric sensors, limit switches and the like provided before the adhesive coating blocks 38 (on the infeed side of the thin plate), and is intended to detect the front end of the thin plate and to supply the detection signal to the controller and the rocking apparatus. The operating timings of the control valve and the rocking apparatus are controlled by a control mechanism for transmitting the detection signal from the thin plate detector through a magnetic memory, a shift register, and a timer capable of delaying the signal.

In this embodiment, the discharge of the adhesive is controlled by a control valve such as a solenoid valve; however, for example, a mechanism consisting of a rotary valve, a joint and an air cylinder may be used with the same effect.

For the adhesive coating apparatus, conventional adhesive coating apparatuses capable of coating the adhesive on the scarf cut surface, such as a spray system, a curtain coater system, a roll coater system and an extruder system may be used instead of the apparatus described in this embodiment.

Further, the adhesive is not limited to the thermoplastic adhesive in this embodiment. It is also possible to use thermosetting adhesives, rubber adhesives or the like.

In this embodiment, an adhesive is coated on the front end cut surface of the subsequent thin plate; however, the coating is not limited thereto, and the adhesive may be coated on the rear end cut surface of the preceding thin plate instead.

Joining Apparatus

A joining apparatus 15 is disposed after the adhesive coating apparatus 37 (see FIGS. 8 and 12). The joining apparatus 15 includes a fixed lower supporting plate 44, and an upper pressing plate 46 which detects the front end of the carried thin plate 18' and which can be vertically moved by use of a clamping apparatus 45 such as an air cylinder. The joining apparatus 15 is intended to completely solidify and harden the coated adhesive and to forcibly join the end surfaces of the thin plates to each other. Passages 43, for circulating cooling water, are provided in the lower supporting plate 44 and the upper pressing plate 46.

The following thin plate 18 coated at the front end scarf surface with an adhesive by the adhesive coating apparatus 37 is carried by the feed conveyor 14, and is pushed to the rear end of the preceding thin plate 18' which is stopped in the joining apparatus 15. The following thin plate 18 pushes the preceding thin plate 18' by a slight amount, and is then stopped to be positioned within the joining apparatus 15. Subsequently, the upper pressing plate 46 of the joining apparatus 15 descends so as to press the thin plates 18,18' together and thereby creates a strong join without generating a gap between the scarf surfaces. Since the scarf surfaces of the front and rear ends of the thin plates have the stepped portions 49,49' in their central parts, joining failures whereby the front end of the following thin plate overlaps the rear end of the preceding thin plate in the stand-by condition, thereby causing a positional deviation and/or a gap therebetween, are eliminated. This also makes it possible to obtain sufficient horizontal joining pressure during press-feed and obtain a stronger joint.

In this embodiment, a hot melt adhesive is used for joining the thin plates 18,18'. Accordingly, in order that the adhesive solidifies in a short time, the parts of the lower supporting plate 44 and the upper pressing plate 46 in contact with the thin plate are made from a material with a high thermal conductivity. Further, the lower supporting plate 44 and the upper pressing plate 46 are formed with the passages 43 and are cooled by passing water through the passages 43. The part of the pressing plate 46 in contact with the thin plates 18,18' may be provided with a polytetrafluoroethylene (Teflon trade mark) coating, or covered with a thin plastic film, which makes it possible to prevent adhesion of the hot melt adhesive thereon.

Full Size Clipping Apparatus

After the specified pressing time has elapsed, the joined thin plate 18 is released from the upper pressing plate 46, is moved from the joining 20 position by the feed conveyor 14, and the rear end thereof is joined to the front end of the following thin plate in the same manner. The thin plates thus sequentially joined are transferred to a full size clipping apparatus 16 and cut to a predetermined length. The control of full size clipping is performed by a method wherein a conventional detecting means, such as photoelectric sensors, limit switches-or the like, on a feed conveyor 47 provided just after the full size clipping apparatus 16 detects whether the length of the joined thin plate 18 has reached the predetermined value.

The thin plates, cut to full size, are carried to a joined thin plate stacking section 17 by the feed conveyor 47, and are stacked thereon.

The structure and the operational effect of this embodiment has been thus described. In addition, this embodiment is particularly effective for the so-called end joining of wood materials in the fiber direction.

Since the thin plate cutting/joining apparatus according to the present invention can cut the end surfaces of thin plates in stepped scarf shapes, it is possible to generate sufficient joining pressure on the joining surfaces of the thin plates 18,18' by sequentially press-feeding the thin plates 18,18' in the feed direction, and hence to make a strong joint without any deviation of the joining surfaces in the vertical direction. Further, by adjusting the heights of the thin plate pressing apparatuses, even when the plate thickness is changed, the stepped portion of the scarf is formed nearly in the central part of the plate thickness, so that it is possible to obtain a preferred joint state and sufficient joint strength even when the plate thickness is changed.

Since the cutting and joining are performed separately, it is possible to perform the cutting and joining concurrently by mass production and to perform continuous feeding. This significantly improves productivity. In addition, since the cutting and joining are performed in the same plane, any complicated mechanism is eliminated, which simplifies daily maintenance and management.

Additionally, by adjusting the heights of the thin plate pressing apparatuses, the joining may be performed while slightly orienting the sharp portions of the cutting surfaces of the thin plates outward, thus making it easy to apply a surface finish.

While a preferred embodiment of the invention has been described using specific terms, such a description is for illustrative purposes only, and it is to be understood that changes and variations may be made without departing from the spirit or scope of the following claims.

What is claimed is:

1. A thin plate cutting/joining apparatus, comprising:
    infeed conveyor control means for controlling operation of an infeed conveyor in such a manner that a front end of a following thin plate reaches a specified front end stopping position;
    feed conveyor control means for controlling operation of a feed conveyor in such a manner that a rear end of a thin plate preceding said following thin plate reaches a specified rear end stopping position;
    a cutting apparatus for pressing and holding the rear end of said preceding thin plate and the front end of said following thin plate at said stopping positions, and cutting the rear and the front ends of said preceding and following thin plates in stepped scarf shapes, respectively;
    a feed conveyor for carrying said preceding and following thin plates cut at the rear and front ends by said cutting apparatus to remaining parts of the thin plate cutting/joining apparatus;
    an adhesive coating apparatus provided in a path of said feed conveyor for coating an adhesive on at least one cut surface of the rear end and the front end of said preceding and following thin plates cut at the rear and the front ends respectively; and
    a joining apparatus for pushing the front end of said following thin plate against the rear end of said preceding thin plate after the adhesive is coated by said adhesive coating apparatus to thereby adhesively bond the rear and front ends of said preceding and following thin plates respectively to each other.

2. The thin plate cutting/joining apparatus according to claim 1, wherein said cutting apparatus reciprocatingly moves along rails proved between said infeed conveyor and said feed conveyor so as to be perpendicular to the feed direction for concurrently cutting the rear end of said preceding thin plate and the front end of said following thin plate, which are both pressed and held.

3. The plate cutting/joining apparatus according to claim 2, wherein positional heights of a first pressing apparatus and a second pressing apparatus for holding the rear and front ends of said preceding and following thin plates during cutting respectively can be adjusted separately for the cutting of said thin plates.

4. The plate cutting/joining apparatus according to claim 3, wherein two sets of circular saws, each set being formed of two circular saws having different diameters which overlap each other, are mounted around a shaft of an inclined motor for concurrently cutting the rear and front ends of said preceding and following thin plates in stepped scarf shapes.

5. The thin plate cutting/joining apparatus according to claim 3, wherein two sets of circular saws, each set being formed of two circular saws having different diameters which overlap each other, are mounted independently to shafts of two inclined motors for concurrently cutting the rear and front ends of said preceding and following thin plates in stepped scarf shapes.

6. The thin plate cutting/joining apparatus according to claim 3, wherein stepped bevel-like cutters are mounted around vertical shafts of motors in such a manner as to be vertically reversed with respect to each other for concurrently cutting the rear and front ends of said preceding and following thin plates in stepped scarf shapes.

7. The thin plate cutting/joining apparatus according to claim 1, wherein said cutting apparatus includes two circular saws which have different diameters that overlap with each other and are mounted around an inclined rotational shaft.

8. The thin plate cutting/joining apparatus according to claim 1, wherein said cutting apparatus includes a stepped bevel-like cutter mounted around a vertical rotational shaft.

9. The thin plate cutting/joining apparatus according to claim 4, wherein a lowermost point in a center of a tooth thickness of a small diameter circular saw for cutting the rear end of said preceding thin plate and an uppermost point in a center of a tooth thickness of a small diameter circular saw for cutting the front end of said following thin plate are set to be spaced apart from a feed plane by specified heights.

10. The thin plate cutting joining apparatus according to claim 1, further comprising a first pressing apparatus and a second pressing apparatus, each pressing apparatus for pressing an appropriate end portion for one of said preceding and following thin plates during the cutting of said thin plate, each said pressing apparatus comprising a first base plate; an elastic body attached to said first base plate and contacting a surface of said thin plate; a second base plate; and a material which is capable of being cut together with said thin plate attached to said second base plate and contacting an opposite surface of said thin plate at a portion liable to be in contact with a cutting member of the cutting apparatus.

11. A thin plate cutting/joining method, comprising the steps of:
    cutting joint ends of thin plates in complementary stepped scarf shapes, respectively;
    applying an adhesive on at least one cut surface having the stepped scarf shape; and contacting both adhesive coated surfaces closely to joint said thin plates.

12. A thin plate cutting method for forming cut surfaces to join thin plates, comprising the step of:

moving a cutting apparatus along an end of a thin plate to form a cut surface with a stepped scarf shape, said cutting apparatus being provided with at least one set of circular saws, said at least one set being formed of two circular saws having different diameters which are overlapped to each other, and said set of circular saws being mounted around a rotational shaft inclined with regard to a surface of the thin plate.

13. The thin plate cutting method according to claim 12, wherein the cutting apparatus has inversely mounted sets of circular saws for forming complementary stepped scarf shapes in opposing ends of two thin plates simultaneously.

14. A thin plate cutting method for forming a cut surface to join thin plates, comprising the step of:

moving a cutting apparatus along opposing two ends of thin plates to form a cut surface with a complementary stepped scarf shape in the opposed ends, said cutting apparatus being provided with a pair of oppositely oriented stepped bevel-like cutters mounted on rotational shafts, said rotational shafts being set perpendicular to a surface of the thin plate.

15. A thin plate joining method, comprising the steps of:

pressing a front end of a following thin plate to a rear end of a preceding thin plate, said front end and said rear end of said following and preceding thin plates respectively being cut in complementary stepped scarf shapes, at least one of said front end and said rear end coated with an adhesive and said following thin plate fed by a driving force until stopped by said preceding thin plate held by pressure applied to both surfaces of said preceding thin plate, pressing both the rear and front ends of said thin plates to join firmly without causing overlap or gap between joint ends.

16. The thin plate cutting/joining apparatus according to claim 1, wherein said joining apparatus further vertically presses the front end of said following thin plate and the rear end of said preceding thin plate during the adhesive bonding.

* * * * *